United States Patent [19]

Grimm

[11] Patent Number: 5,257,925
[45] Date of Patent: Nov. 2, 1993

[54] APPARATUS FOR REMOVING ARTICLES FROM A MOLD CAVITY

[75] Inventor: Berndt Grimm, Konstanz, Fed. Rep. of Germany

[73] Assignees: Karl-Josef Gaigl, Singen; Veronika Waldorf, Stockach, both of Fed. Rep. of Germany; a part interest

[21] Appl. No.: 730,967

[22] PCT Filed: Jan. 29, 1990

[86] PCT No.: PCT/DE90/00054
§ 371 Date: Sep. 19, 1991
§ 102(e) Date: Sep. 19, 1991

[87] PCT Pub. No.: WO90/08625
PCT Pub. Date: Aug. 9, 1990

[30] Foreign Application Priority Data

Jan. 27, 1989 [DE] Fed. Rep. of Germany ....... 3902447
Oct. 27, 1989 [DE] Fed. Rep. of Germany ....... 3935838

[51] Int. Cl.$^5$ ............................................. B29C 45/43
[52] U.S. Cl. .................................... 425/556; 264/334; 425/444
[58] Field of Search ............... 425/554, 556, 437, 438, 425/441, 444; 264/334

[56] References Cited

U.S. PATENT DOCUMENTS

| 3,734,666 | 5/1973 | Guest et al. | 425/437 |
| 4,901,589 | 2/1990 | Gaigl | 425/556 |

FOREIGN PATENT DOCUMENTS

| 256523 | 2/1988 | European Pat. Off. |
| 3902447 | 2/1990 | Fed. Rep. of Germany |
| 1346584 | 1/1963 | France |
| 2559086 | 2/1985 | France |
| 124572 | 2/1928 | Switzerland |

*Primary Examiner*—Tim Heitbrink
*Attorney, Agent, or Firm*—Bachman & LaPointe

[57] ABSTRACT

The present invention relates to an apparatus which includes a drive element connected to one mold half which drives a drive wheel on the other mold half and thereby sets a rocker in pivoting motion, in accordance with which an arm with the removal apparatus can be guided out of the mold cavity by the rocker sliding into a channel between two guide strips and moving out of this channel in each predetermined end position of the arm, and the arm being held in these end positions, wherein in each end position a locking unit fixed on the mold half accomplishes the fixing of the arm.

21 Claims, 11 Drawing Sheets

APPARATUS FOR REMOVING ARTICLES FROM A MOLD CAVITY

BACKGROUND OF THE INVENTION

The invention relates to an apparatus for removing articles from, for example, a mold cavity between two mold halves of a machine, in particular an injection-molding machine, press or the like, there being connected to one mold half a drive element, which drives a drive wheel on the other mold half and thereby sets a rocker in pivoting motion, by means of which an arm with the removal apparatus can be guided out of the mold cavity by the rocker sliding into a channel between two guide strips and moving out of this channel in each predetermined end position of the arm, and the arm being held in these end positions.

Such apparatuses are known, for example, from International Patent Application WO 88/03238. In the embodiments shown there, a handling mechanism is introduced by mechanical means into the mold cavity of an injection-molding machine during the opening of the movable mold half and during closing of the injection-molding machine is forcibly moved out again from the mold cavity together with the article to be removed. Furthermore, although a carriage, on which the removal apparatus is fixed, is held in the respective end positions, there are always one or more pressure rollers interacting with a fixed stop. Although the apparatus has proved successful in practice, it is of a relatively complex construction and requires a great number of individual elements, which may be subject to wear, especially as these apparatuses are in some cases used in three-shift operation and enter the mold cavity of an injection-molding machine several times a minute.

SUMMARY OF THE INVENTION

The inventor has set himself the object of improving the fixing of the arm or carriage in the end positions and making the handling of the apparatus more reliable.

It leads to the achievement of this object that in each end position a locking unit fixed on the mold half accomplishes the fixing of the arm.

This preferably takes place by means of a single slide, which in the precisely defined end positions engages with corresponding detents in grooves or engages behind locking bars. In this arrangement, this slide is assigned a drive unit, which preferably comprises a rack and gear parts correspondingly coordinated with one another. As a result, an exact fixing and securing of the arm in its end positions is accomplished in a simple mechanical way.

Furthermore, the connection between the removal apparatus and one mold half can be released by means of a single rod with corresponding eccentrics, so that for example the injection-molding machine can also be operated unaffected without a removal apparatus. In any event, however, it is still ensured that whenever the machine closes, the arm or the removal unit connected to it is moved out of the mold cavity.

In the case of a further illustrative embodiment of the invention, the number of elements is reduced considerably, since then the slide has been replaced by simple disks, which interact with a likewise movable forked bolt. There is no longer any stop in the end positions, instead in the end positions, in which the speed of the carriage briefly approaches zero, the carriage is held by the disks once the guide roller has slid out of the guide channel.

According to the invention, the disks have in each case a sector cut-out, by which two control edges which can enter the forking of the forked bolt in the respective end position are formed in the solid disk part.

Above all, the adjustment of the end position fixing means is made much easier, since the disks are preferably arranged on a shaft, where they can be displaced. Similarly, in the desired end position, the disks can be turned about the shaft and then fixed in such a way that the desired engaging moment is precisely established.

The shaft itself takes over the movement of the disks, the shaft rotating about its longitudinal axis. This rotation is preferably accomplished by a drive device, which is coordinated with the movement of the crank arm. At the instant at which the crank arm or the guide roller on the crank arm leaves the guide channel, the respective control edge must introduce the solid disk part into the forking of the forked bolt. It goes without saying that a great number of possibilities for electronically or mechanically driving the shaft are conceivable here.

In the preferred illustrative embodiment, however, there is arranged parallel to the rack which sets the crank arm in motion a further rack, which has a connection with the shaft via a gear unit. The corresponding gear wheels in the gear unit are coordinated with one another or with the movement of the crank arm in such a way that the entering of the control edges into the forking coincides with the sliding of the guide roller out of the guide channel In many illustrative embodiments it must also be possible to uncouple the carriage with the corresponding handling mechanism from the opening and closing movement of the injection-molding machine in order to be able to move this machine without a corresponding removal apparatus as well. A good way of achieving the uncoupling is already provided in P 39 02 447.4, but in the illustrative embodiment shown here it is possible that the disk position no longer coincides with the position of the carriage and hence the forked bolt strikes for example against a solid disk part.

This is avoided by the forked bolt being withdrawn into the carriage housing, so that it can readily pass by even the solid disk part. For the sake of simplicity, this withdrawing takes place by means of a tilting lever, which is likewise arranged on the same shaft which actuates the locking device or device for raising a bar described in P 39 02 447.4. This accomplishes the effect that, by a single rotational movement of the shaft, the bar is raised and consequently the guide channel for the guide roller is lifted up, the locking device is brought into the latched position and the forked bolt is brought out of the engagement position with the disks. For the sake of simplicity, this device comprises a tilting lever, which has a pivot point fixed to the housing and is articulated at one end on the forked bolt as well as connected eccentrically to a disk on the shaft.

By reducing the individual elements, the wear has now been considerably minimized and the entire removal apparatus made lighter. For this reason, this removal apparatus can now also be used, for example, for injection-molding machines which run with a shorter cycle or exhibit a greater speed of the opening and closing movement.

BRIEF DESCRIPTION OF THE DRAWINGS

Further advantages, features and details of the invention emerge from the following description of preferred illustrative embodiments as well as with reference to the drawing, in which.

DETAILED DESCRIPTION OF PREFERRED EMBODIMENTS

An apparatus according to the invention for removing articles from an only partly represented injection-molding machine is arranged on the movable mold half 1 of this injection-molding machine. It is mounted with a housing 2 of this mold half 1, whereas laterally a guide 3 protrudes from the mold half 1.

Figure 2:
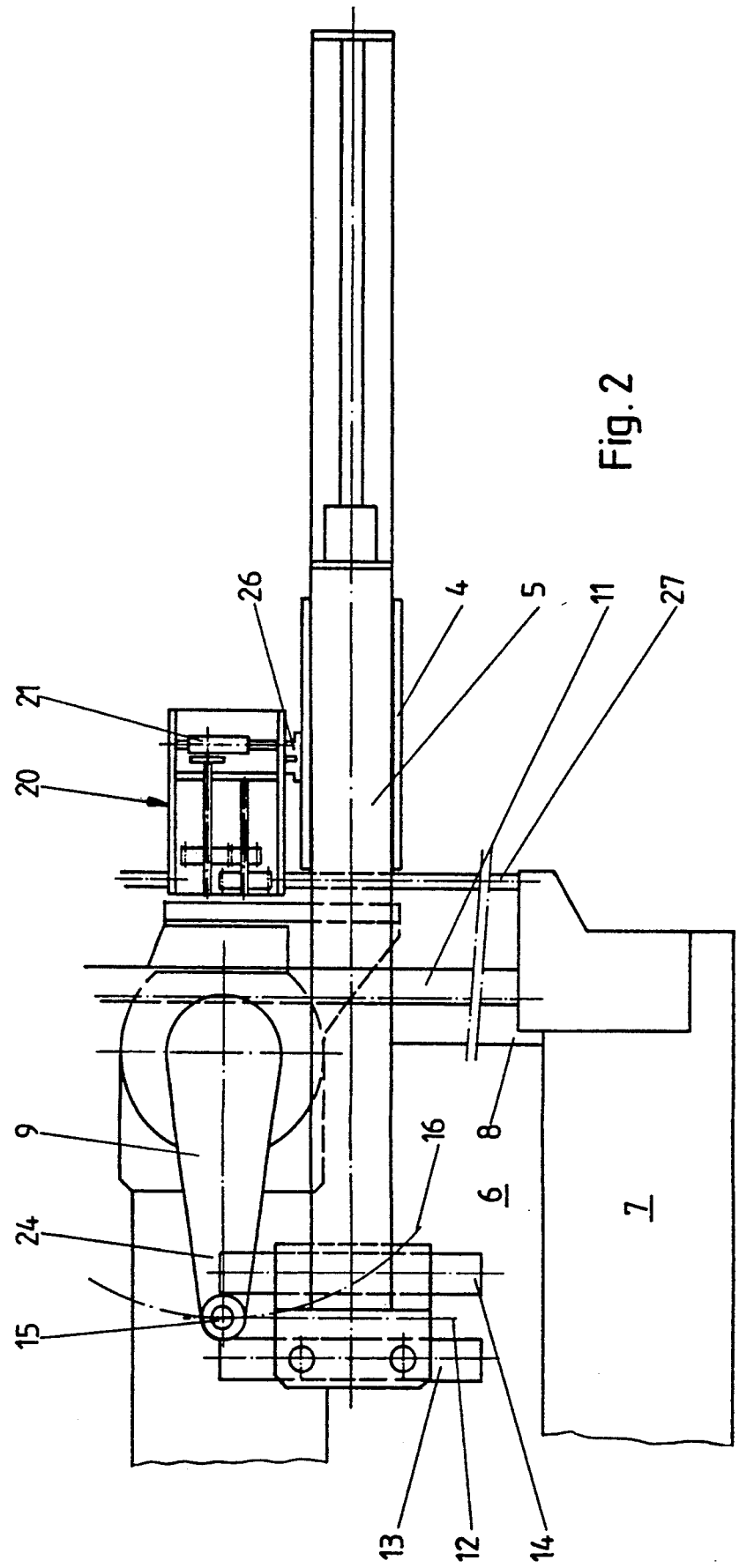
FIG. 2 shows a plan view of the apparatus according to FIG. 1.

On the guide 3, a carriage 4 slides in direction x and thereby brings an arm 5 into the mold cavity 6 between the movable mold half 1 and a fixed mold half 7 (see FIG. 2). The two mold halves 1 and 7 are connected to each other by means of guide pins 8

Also arranged on the arm is a removal arm (not shown for the sake of clarity) for the articles, which arm may be equipped, for example, with corresponding suckers.

The movement of the arm 5 and of the carriage 4 takes place by means of a rocker 9, which is connected to a gear wheel 10 in the housing 2 This gear wheel 10 meshes with a rack 11, which is fixed on the fixed mold half 7. Of course, the opposite arrangement is also conceivable.

The rocker 9 is equipped at its free end with a driving roller 15, which can engage in a channel 12 between two guide strips 13 and 14. By the movement of the rocker 9, the driving roller 15 describes a circle 16, taking the arm 5 along with it for half a revolution. In both end positions, the carriage 4 runs onto stops 17 and 18, the driving roller 15 in each case leaving the channel 12 at the same instant.

A similar arrangement is described, moreover, in more detail in International Application WO 88/03238, to which you are expressly referred here.

Figure 3:
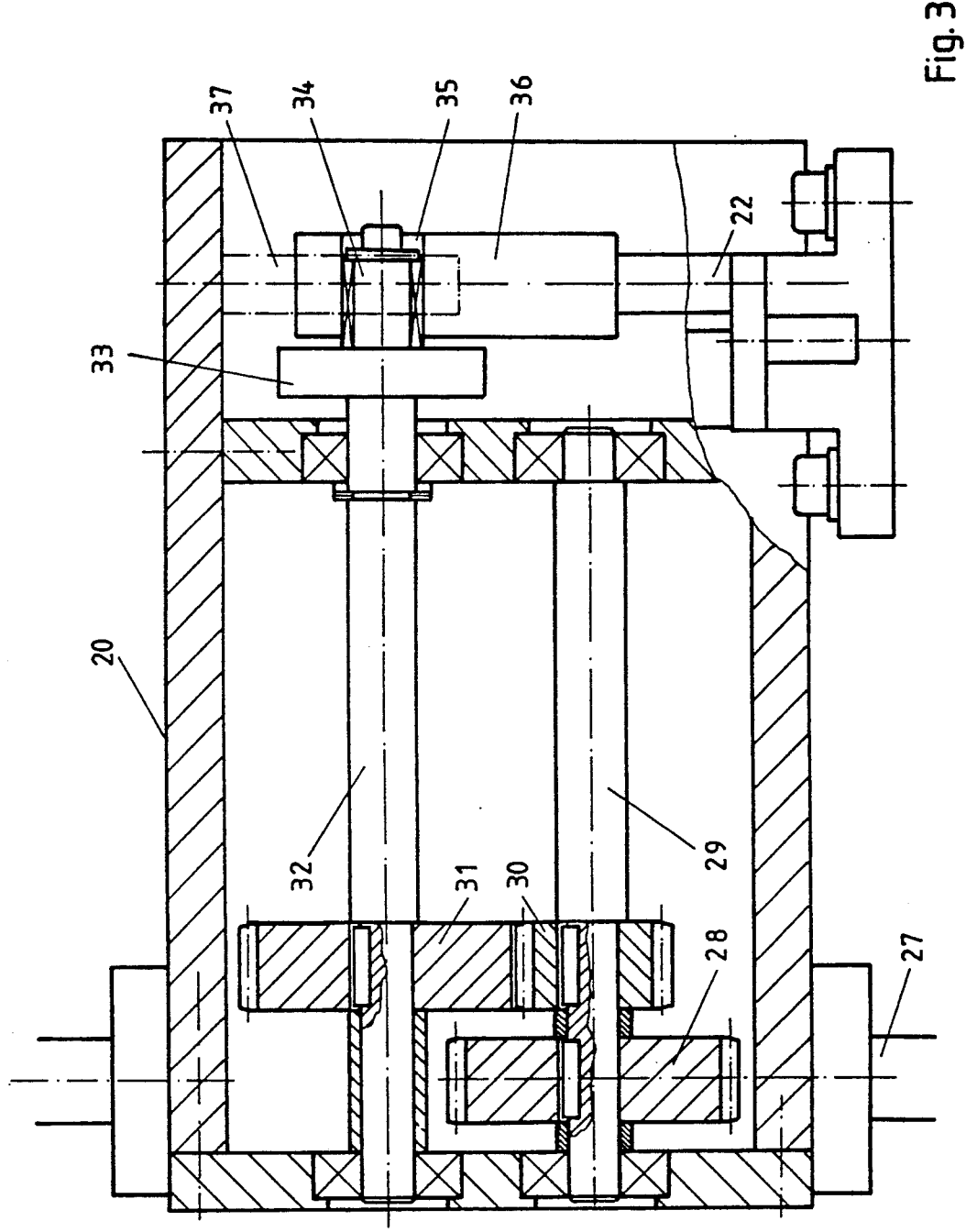
FIG. 3 shows an enlarged plan view of a locking device.

The fixing of the carriage 4, and consequently also of the arm 5, in the respective end positions takes place by a locking unit 20 interacting with the stops 17 and 18. This is represented in more detail in FIGS. 3 and 4. Said unit comprises in particular a slide 21, which can be displaced approximately perpendicularly to the direction of movement x of the carriage 4. In this arrangement, this slide 21 has two detents 22 and 23, which are offset with respect to each other in the direction of displacement y.

In the run-out end position of the carriage 4 (not shown in FIGS. 1 and 2), when the carriage 4 strikes the stop 18, the slide 21 is moved in direction y, the detent 23 sliding into a groove 24 in the guide strip 14. As a result, the carriage 4 is held in this end position exactly between the stop 18 and the detent 23, the rocker 9 leaving the channel 12 and allowing free running over of this end position by the mold halves 1 and 7.

As soon as the arm 5 or the removal unit is to move into the mold cavity 6, i.e. the mold half 1 opens, the rocker 9 is moved in the opposite pivoting direction and the driving roller 15 engages in the channel 12. At this instant, the detent 23 moves out of the groove 24 and releases the arm 5.

As soon as the run-in end position of the arm 5 is reached, the latter strikes the stop 17. At this instant, in turn the slide 21 is moved in direction y and engages behind a locking bar 25, which, passing through a guide channel 26, is arranged laterally on the arm 5 or carriage 4. As a result, the carriage 4 is held in a secured end position between the stop 17 and the detent 22, so that the driving roller 15 can leave the channel 12 and a removal unit can be brought exactly into removal position, even if the mold half 1 runs over its end position.

The movement of the slide 21 in direction y takes place by means of a gear, which is in connection with a further rack 27. This rack 27 is likewise fixed to the mold half 7 and runs parallel to the rack 11.

With the movement of the mold half 1, a gear wheel 28, which is fixed on a shaft 29, is driven by means of the rack 27. Pushed onto this shaft 29 is a further gear wheel 30—of smaller diameter in the present illustrative embodiment—a further gear wheel 31 meshing with the circumferential toothing of the latter. By means of a further shaft 32, this gear wheel 31 drives an eccentric wheel 33, which engages with an eccentrically arranged driving bolt 34 in a slot 35 of a slide carriage 36. This slide carriage 36 is guided on guide rods 37 and bears the slide 21.

An essential point about the present invention is the relationship of the individual gear wheels 28, 30 and 31 to one another. It must be chosen so exactly that the detent 22 only enters the groove 24 and the detent 23 only engages behind the locking bar 25 at the instants when the carriage 4 strikes the stop 17 or 18 and the driving roller 15 leaves the channel 12.

Figure 1:
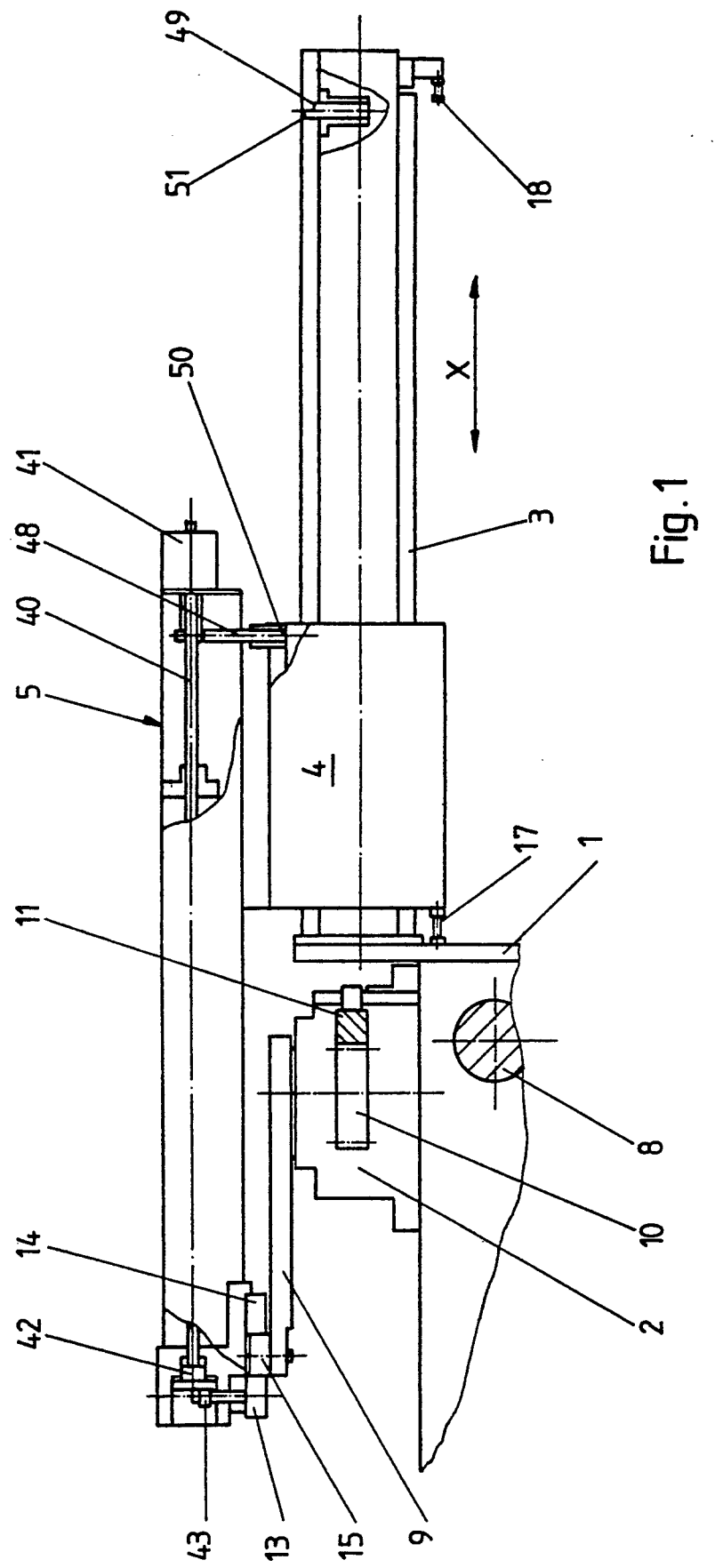
FIG. 1 shows a side view of an apparatus according to the invention for removing articles from an injection-molding device.

If, for whatever reasons, no movement of the carriage and of the arm 5 in direction x is desired, according to the invention an uncoupling of the arm 5 from the movement of mold half 1 is possible. For this purpose, a rod 40, indicated in FIG. 1, is set in rotation by means of a drive 41. This rod 40 is equipped with eccentrics at three points.

At the front, on the tip of the rod there is the eccentric 42. This is connected via an eccentrically arranged strip 43 to the guide strip 13.

Figure 4:
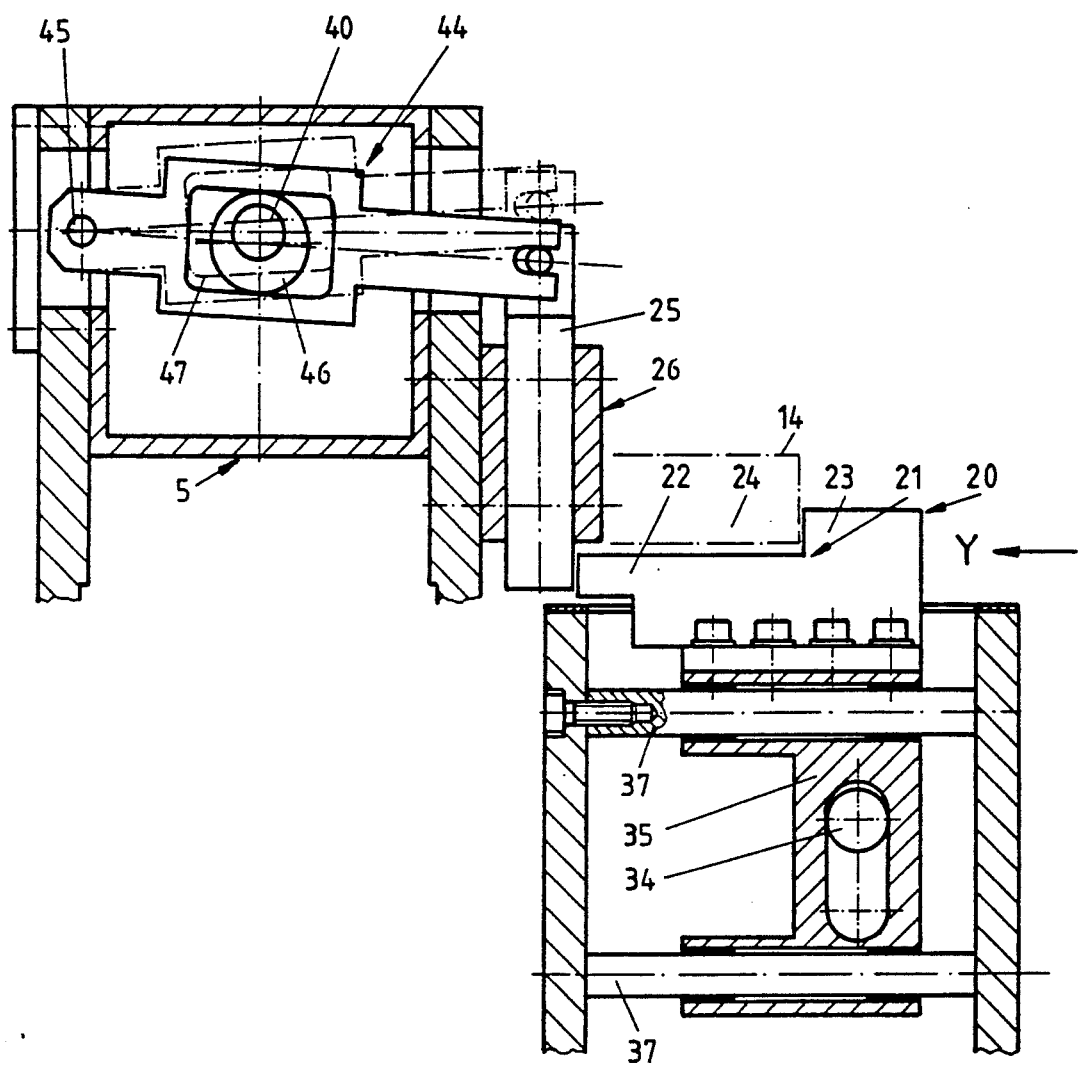
FIG. 4 shows an enlarged representation of the locking device according to FIG. 3 with further locking elements.

Furthermore, the rod 40 according to FIG. 4 passes through a lever arm 44, which has a pivot point 45 with the arm 5. In this arrangement, a disk 46, which turns in a rectangular recess 47 of the lever arm 44, is pushed eccentrically on the rod 40. At the other end from the pivot point 45, the lever arm 44 is connected in an articulated manner to the locking bar 25. With a turning of the rod 40 or of the disk 46, a raising of the lever arm into the position represented by dot-dashed lines takes place, as a result of which the locking bar 25 is raised and disengages from the detent 22.

Finally, there is located close to the drive 41 an eccentrically arranged locking bolt 48, which can be lowered by a turning of the rod 40. As a result, it moves into the region of a pawl 49, which it can run over due to corresponding slide-on surfaces 50 and 51, but into which it snaps once it has run over. Since the pawl 49 is fixed on the guide 3, a securing of the arm 5 is ensured. In this position, moreover, the rocker 9 or driving roller 15 is also disengaged from the channel 12, since the guide strip 13 is raised. The rocker can pivot unaffected, so that the injection-molding machine can also operate without removal apparatus.

Figure 5:
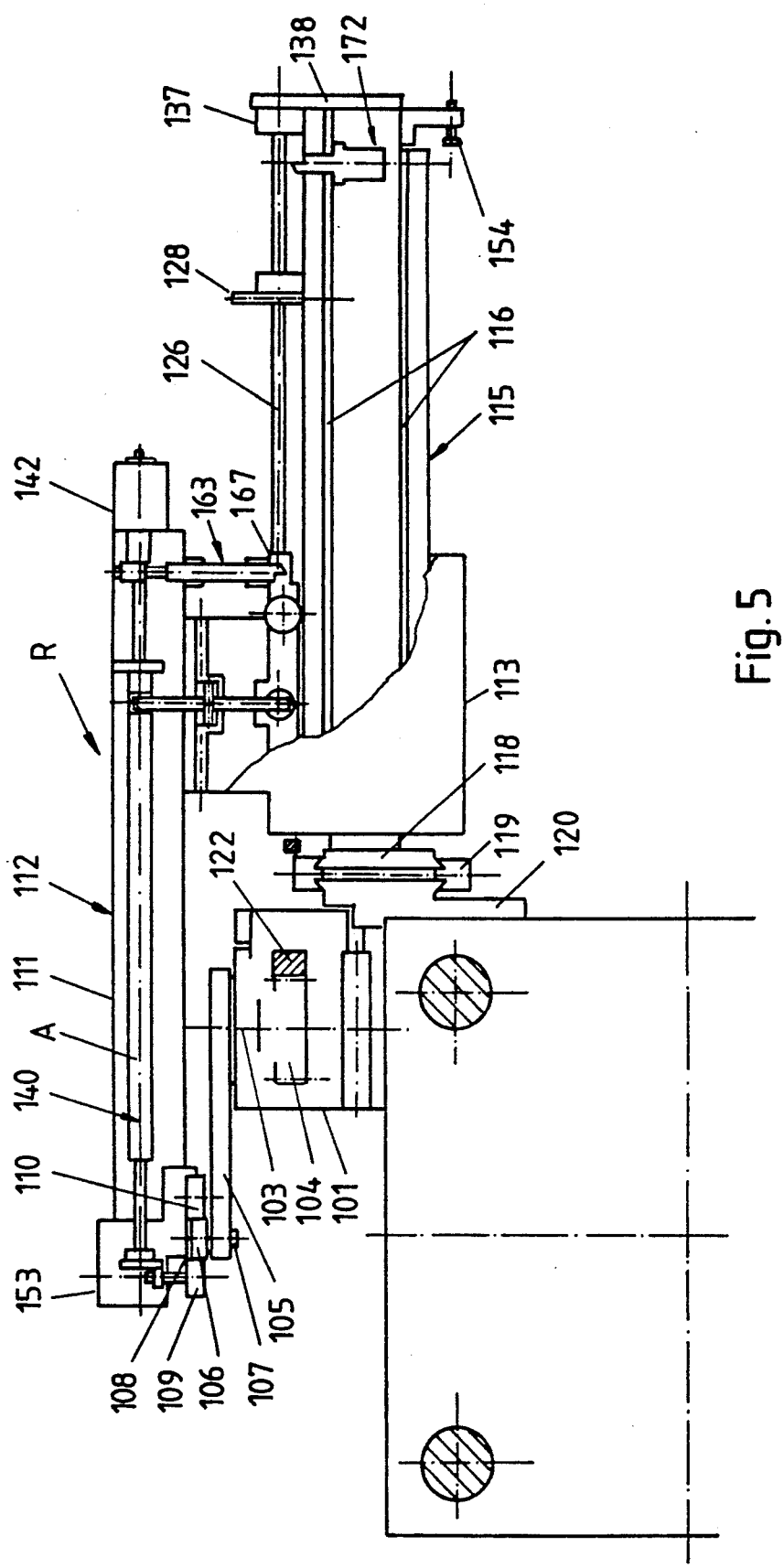
FIG. 5 shows a side view of a further illustrative embodiment of an apparatus according to the invention for removing articles from an injection-molding device.

A further illustrative embodiment of an apparatus R according to the invention, for converting a rotational motion into a linear motion, has, according to FIG. 5, a housing 101, which in the illustrative embodiment shown is attached on a movable mold half 102, for example of a plastics injection-molding machine. In this housing 101, a gear wheel 104 is connected to a crank arm 105 by means of a pivot bolt 103. At the outer end of this crank arm 105, a guide roller 106 is fixed by a threaded bolt and secured by two check nuts 107.

Figure 7:
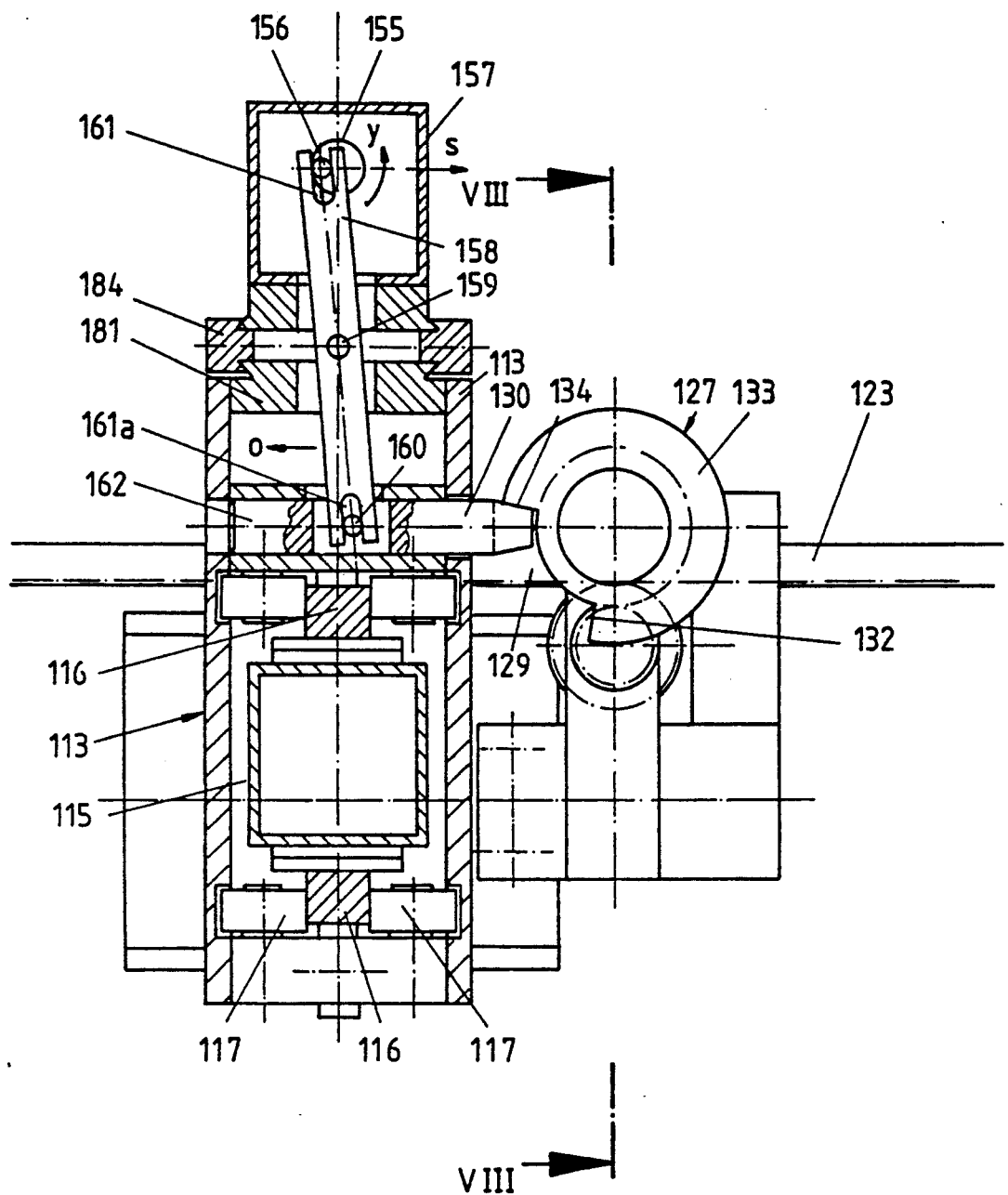
FIG. 7 shows a cross-section through the apparatus according to FIG. 6 along line VII—VII.

The guide roller 106 engages in a guide channel 108, which is formed by two strips 109 and 110. The strips 109 and 110 are attached to the underside of a carriage arm 111. The carriage arm 111 rests on a carriage housing 113 and forms with the latter a carriage 112, which can move in direction x. A guide arm 115 passes through the carriage housing 113, this guide arm 115 having guide rails 116, on which guide rollers 117 can roll, as shown in FIG. 7.

The guide arm 115 has a flange piece 118, which detachably connects the guide arm 115 via a further flange piece 120 to the mold half 102 by means of clamping jaws 119.

Figure 6:
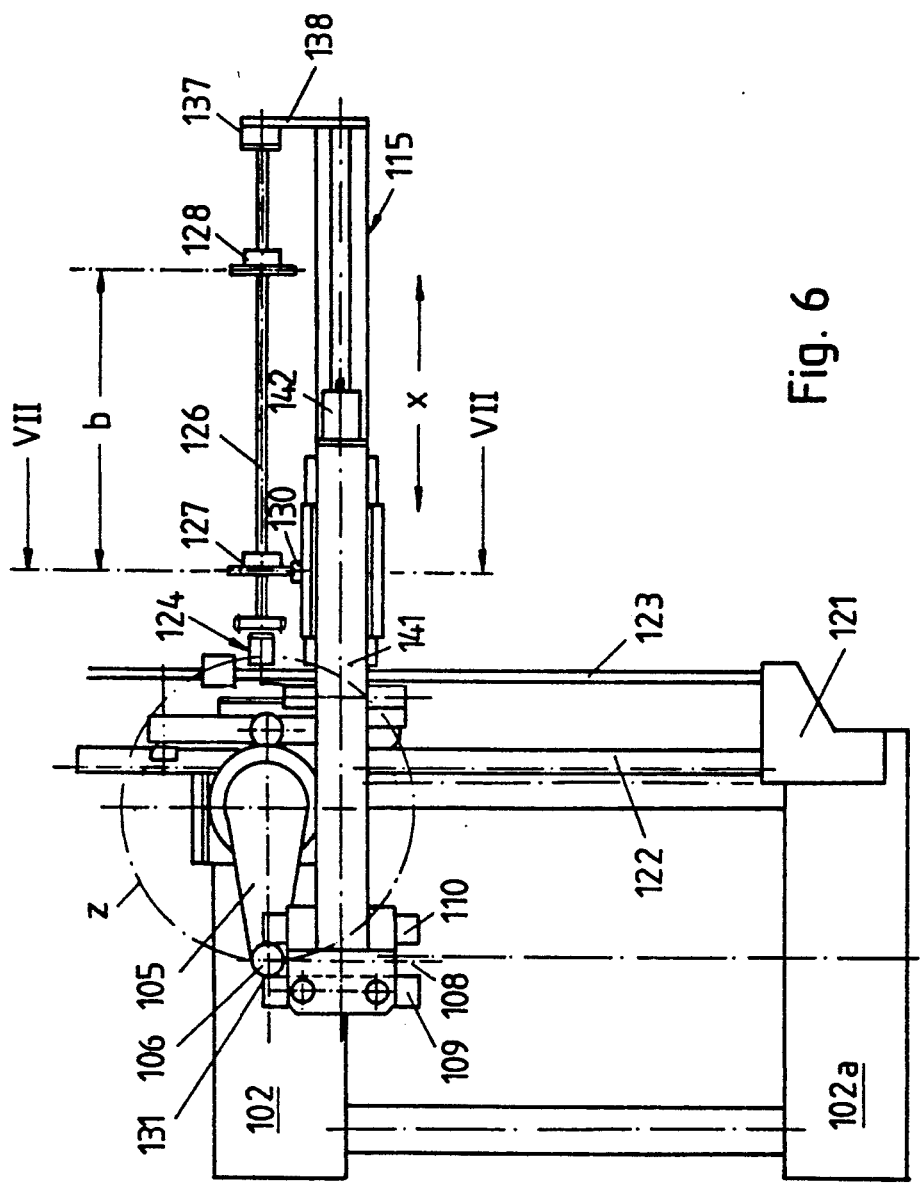
FIG. 6 shows a plan view of the apparatus according to FIG. 5.

According to FIG. 6, fixed on the other mold half, not movable in the present illustrative embodiment, there is a mounting block 121, which holds two racks 122 and 123, which run perpendicularly to the direction of movement x.

The one rack 122 runs through the housing 101 and meshes there with the gear wheel 104, as a result of which the crank arm 105 is set in pivoting motion z about the bolt 103.

The guide roller 106 runs in the guide channel 108 and, with its circular movement z about the pivot bolt 103, moves the carriage 112 along the guide arm 115 in direction x. The pivoting of the crank arm 105, forcibly controlled by the rack 122, takes place in such a way that, when the mold half opens, the carriage 112 is moved to the left and consequently enters a handling means between the mold halves, which is not shown in any more detail and is preferably fixed to the carriage housing 113. This handling means grasps the articles produced when the movable mold half 102 is at a standstill. When the mold halves close, the crank arm 105 is set in an opposite pivoting direction, taking the carriage 112 with it to the right along the guide arm 115 and thus moving the handling means out of the space between the two mold halves before the injection-molding machine is closed. During the subsequent injection-molding operation, the articles removed can be set aside in an orderly fashion.

Figure 8:
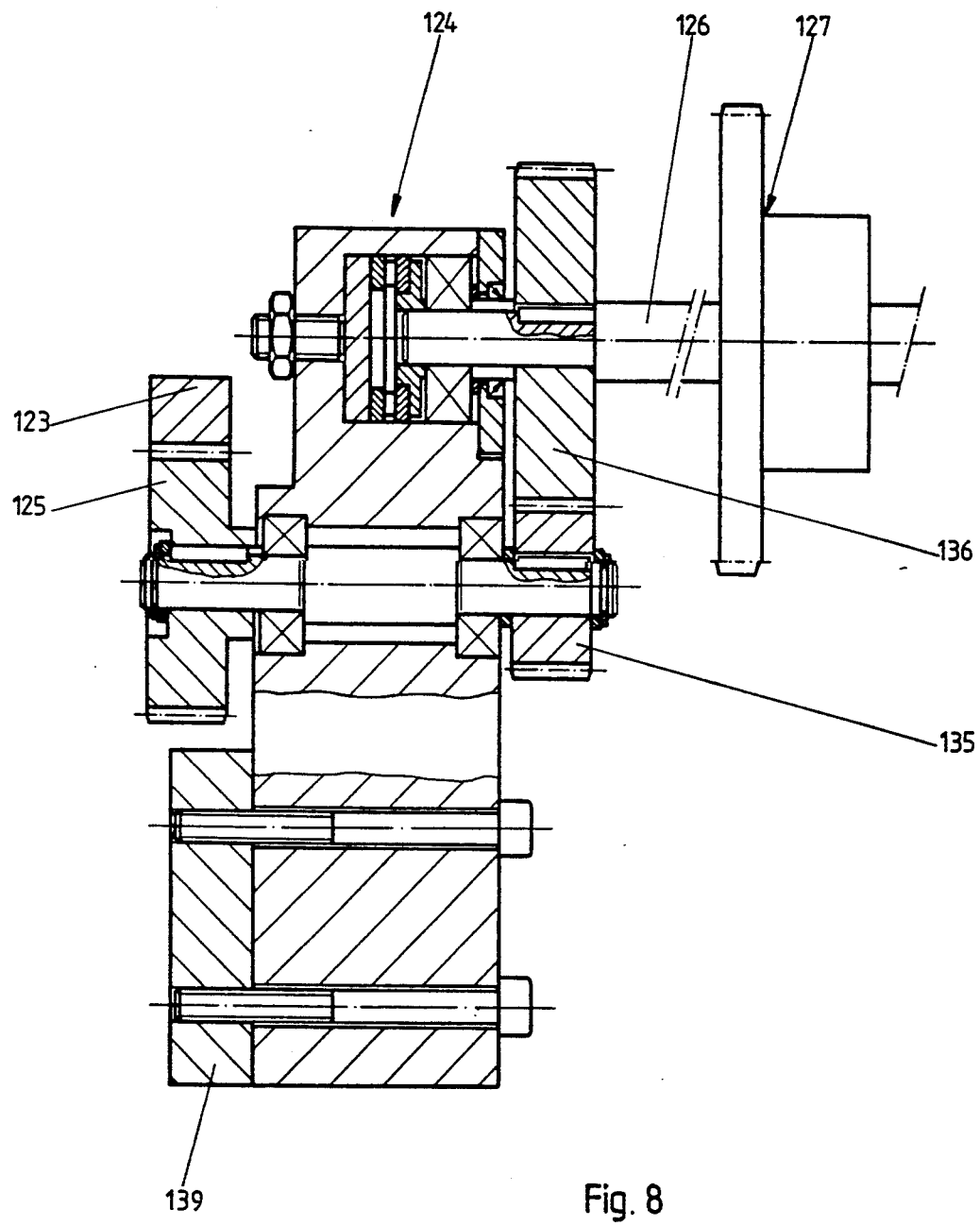
FIG. 8 shows a partly represented cross-section through FIG. 7 along line VIII—VIII in the region of a gear unit.
Figure 9:
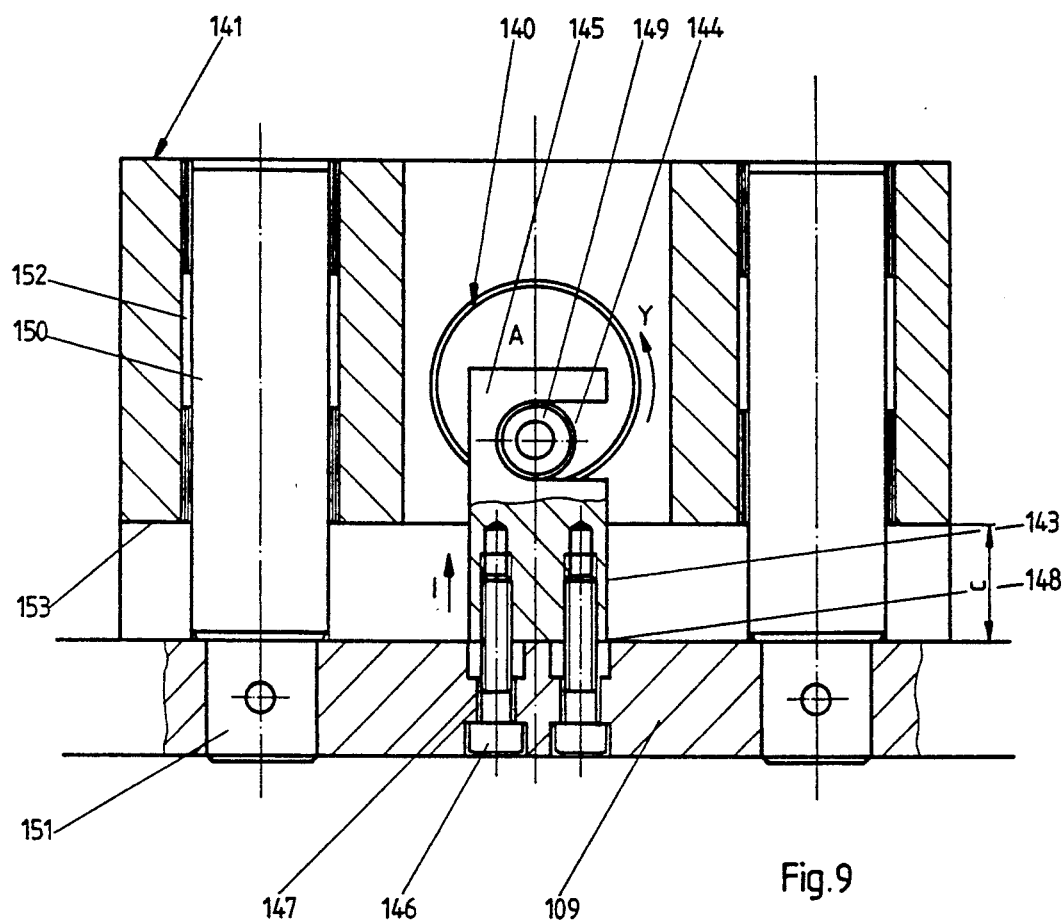
FIG. 9 shows a cross-section through the front region of a carriage arm with a device for raising a bar.

According to FIG. 8, the rack 123 meshes with a spur wheel 125 of a gear unit 124, as a result of which a shaft 126 is set in rotational motion. Two disks 127 and 128, spaced apart from each other, are pushed on this shaft 126 and fastened detachably to the shaft 126. Each disk 127 and 128 has a sector cut-out 129, shown in FIG. 7, the disk 127 and 128 interacting by the sector cut-out 129 with a forked bolt 130, protruding from the carriage housing 113.

In the open position of the two mold halves of the injection-molding machine, the guide roller 106 on the crank arm 105 has reached the control edge 131 of the guide channel 108 and can leave the latter if it pivots any further In this position, the disk 127 engages with a control edge 132 of its solid disk part 133 in the forking of the forked bolt 130 on the carriage housing 113 on account of the forcibly controlled rotation of the shaft 126 via the gear unit 124. The carriage 112 or the carriage housing 113 with the handling means (not shown in any more detail) is consequently held in an end position.

If the two mold halves are opened further than necessary or intended, the pivoting movement of the crank arm 105 is also forcibly taken further beyond the actual end point.

To the same extent as the pivoting movement of the crank arm 105 is taken further, the shaft 126 is also rotated further via the gear unit 124. This accomplishes the effect that the disk 127 moves with its solid part through the forking of the forked bolt 130. Since the guide roller 106 has left the guide channel 108, the carriage 112 or the carriage housing 113 is fixed and secured in its predetermined end position and can no longer be displaced in any direction.

When both are closed, the crank arm 105 executes an opposite pivoting movement by means of the pivot bolt 103. The guide roller 106 on the crank arm 105 again engages in the guide channel 108. At that moment, due to a likewise opposite rotational movement of the shaft 126, the solid disk part 133 of the disk 127 has left the forking of the forked bolt 130 via the control edge 132, so that the forked bolt 130 for its part engages in the sector cut-out 129 of the disk 127.

The carriage 112 or the carriage housing 113 is disengaged and can be taken along in the guide channel 108 in direction x by the pivoting movement z of the crank arm 105 by means of the guide roller 106.

In the position for use, the direction of displacement x is assigned a certain displacement distance b. The displacement distance b is fixed by the length of the crank arm 105, whereby the spacing of the two disks 127 and 128 is also determined.

Once the crank arm 105 has, by a pivoting movement z, displaced the carriage 112 by a distance b in direction x, the guide roller 106 in turn reaches the control edge 131 of the strips 109 and 110. At the same time, the forked bolt 130 ends up exactly in front of the disk 128. During the course of the carriage movement x, the disk 128 is turned via the shaft 126 in such a way that it enters with the control edge, which corresponds to a control edge 134 of the disk 133 in FIG. 7, into the forking of the forked bolt 130. To reach this position, the forked bolt 130 has previously run through in direction x a part of the sector cut-out of the disk 128 corresponding to the sector cut-out 129 of the disk 127.

If the two mold halves 102 and 102a are closed closer than intended, the guide roller 106 leaves the guide channel 108 without taking with it the carriage 112 or the carriage housing 113 further in direction x. By the further moving of the rack 123, the shaft 126 is also turned via the gear unit 124, and with it the disks 127 and 128. This turning accomplishes the effect that the disk 128 runs with its solid disk part through the forking of the forked bolt 130 and blocks the carriage 112 or the carriage housing 113 against any further displacement.

The carriage 112 or the carriage housing 113 is fixed and secured in another end position. The precise coordination of the end position securing means takes place by the corresponding arrangement of the disks 127 and 128 on the shaft 126 on the one hand and by the choice of a corresponding gear transmission in the gear unit 124. The transmission of the gearing of the gear unit 124 (see FIG. 8) and consequently the rotational speed of the shaft 126 can be changed by corresponding interchanging or exchanging preferably of gear wheels 135 and 136.

The shaft 126 with the disks 127 and 128 has opposite the gear unit 124 a counter-bearing unit 137. The housing of the gear unit 124 and of the counterbearing unit 137 serve at the same time for receiving fastening elements, such as for example screws, screw bolts or the like, by which a firm connection to the guide arm 115 is established by means of plates 138, 139, angles or the like attached to the two end faces of the guide arm 115.

For uncoupling the carriage drive from the movement of the crank arm 105, according to the invention there is fitted in the carriage 112 a shaft 140, which on both sides is rotatably mounted in each case in a housing 141 of the carriage arm 111 in bearings, bushes or the like (not shown in any more detail). For driving the shaft 140, a preferably pneumatic rotary drive 142, which can in a controlled manner set the shaft 140 in a rotational motion, is provided at one end of the carriage arm 111.

Attached to the underside of the housing 141 of the carriage arm 111 are the strips 109 and 110 forming the guide channel 108. Whereas the strip 110 is firmly attached to the underside of the carriage arm 111, the strip 109 has an articulated connection via a flat iron 143 to a bolt 144 on a disk 145 on the shaft 140. In this arrangement, the bolt 144 is arranged eccentrically on the disk 145. The flat iron 143 is on the one hand fastened by two screws 146, screw bolts or the like to the strip 109, the screws 146, screw bolts or the like protruding through bores 147 in the strip 109 into the foot side 148 of the flat iron 143 and ensuring firm seating. On the other hand, the flat iron 143 has a depression-shaped clearance 149, into which the bolt 144 engages.

Two guide pins 150, which are fitted to the right and left, correspondingly spaced apart, of the flat iron 143 firmly in the strip 109 by threaded stems 151 or the like, pass through bores 152 in the housing 141 of the carriage arm 111. These guide pins 150 together with the flat iron connection provide a firm and absolutely stable retention of the strip 109.

Between the strip 109 and the underside 153 of the housing 141 of the carriage arm 111 there is formed a clear spacing c. If the shaft 140 is turned in particular with the disk 145 in direction y, the strip 109 is also moved in direction t by the movement of the eccentrically attached bolt 144, via the flat iron 143. The guide pins 150 thereby run through their bores 152. A turning in direction y about the axis of rotation A is possible to an extent corresponding to the spacing c between the strip 109 and the underside of the housing of the carriage arm 111. If this spacing c in direction t is overcome, the guide roller 106 is released.

If the crank arm 105 is now set in pivoting motion, the carriage 112 can be moved away from the mold halves 102 and 102a by means of the guide roller 106, which runs off along the strip 110. A handling means (not shown in any more detail), attached to the carriage housing 113, is in any event run out of the space between the two mold halves 102 and 102a. If the crank arm 105 is again set in the opposite pivoting direction, the guide roller 106 now runs underneath the strip 109 and can no longer displace the carriage 112, and consequently the carriage housing 113, in the opposite direction x. The carriage 112 or the carriage housing 113 continues to remain in the run-out position and the handling means (not shown in any more detail) does not engage in the space between the two mold halves.

If the carriage 112 or the carriage housing 113 is to be fixed by the handling means (not shown in any more detail) in an end position beyond the disk 128, a displacement up to a stop 154 takes place. In order that the solid disk part of the disk 128 cannot possibly cause a problem here by striking against the forked bolt 130, according to the invention the latter is to be withdrawn into the carriage housing 113. For this purpose, a further disk 155 is attached on the shaft 140, as shown in FIG. 7, which disk has for its part an eccentrically attached bolt 156. From this bolt 156, a connection to a bolt 160 on the forked bolt 130 is established by means of a tilting lever 158 via a pivot point 159. In this arrangement, the tilting lever 158 has at both ends guide slits 161 and 161a, respectively, into which bolts 156 and 160 respectively engage. The forked bolt 130 is made to fit a guide duct 162, so that in the position for use it protrudes out of the carriage housing 113 to the extent that the disks 127 and 128 can engage in its forking.

If, as described above, the shaft 140 is turned in direction y, the disk 155 is also turned in direction y. This turning accomplishes the effect that the eccentrically mounted bolt 156 moves the upper half of the tilting lever 158 about the pivot point 159 in direction s by its engaging in the guide slit 161. As a result, the lower half of the tilting lever 158 is forcibly displaced oppositely to direction s in a direction o. By the engaging of the bolt 160 in the guide slit 161a, the forked bolt 130 is made to enter the guide duct 162 by the movement of the tilting lever 158, so that said bolt in this case no longer protrudes out of the housing 113. Engaging of the forked bolt 130 in the disk 127 or 128 is no longer possible in this position. The carriage 112 can run past the disk 128 unhindered. The carriage 112 or the carriage housing 113 can be displaced up to the stop 154.

However, now the carriage arm 111 with the carriage housing 113 and a handling means (not shown in any more detail), attached to the housing 113, is freely displaceable in both directions. The handling means could get into the space between the two mold halves 102 and 102a by an unwanted displacement in the direction of the injection-molding machine and cause problems.

Figure 10:
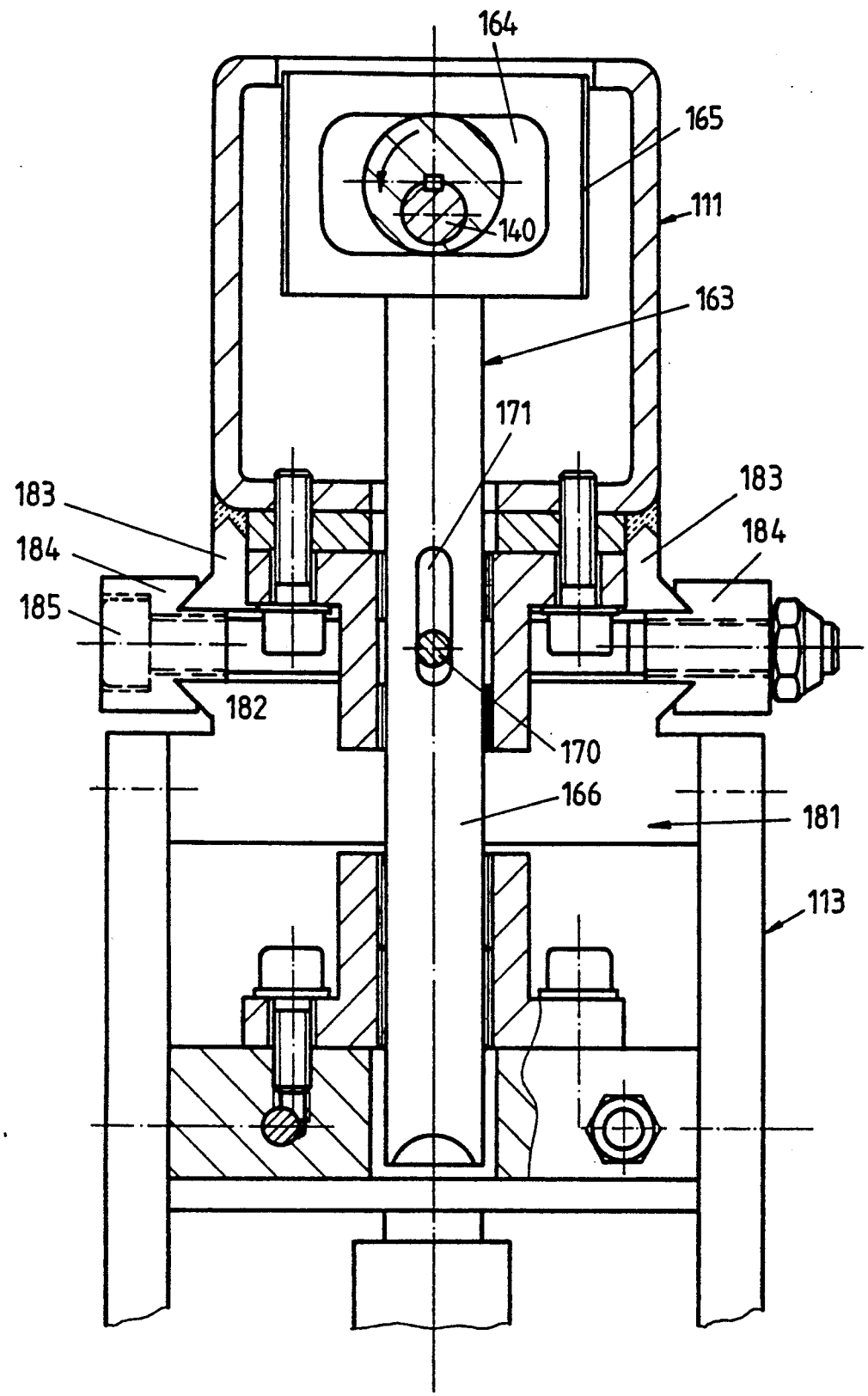
FIG. 10 shows a cross-section through a carriage arm and a partly represented carriage housing in the region of a locking device.
Figure 11:
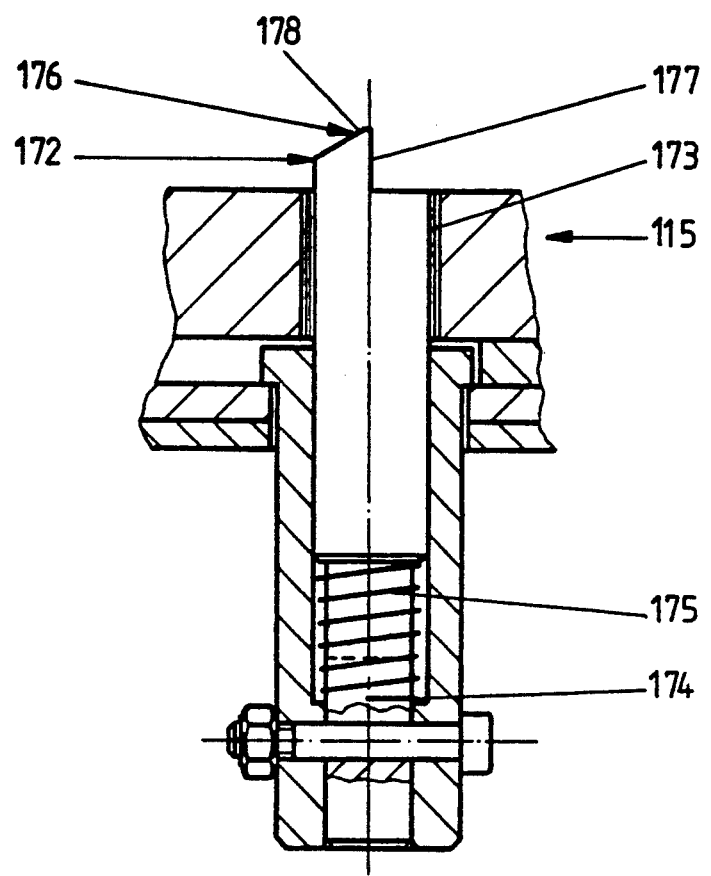
FIG. 11 shows an enlarged side view of a counter element, which interacts with the locking device according to FIG. 10.

Although the handling means is in any event brought out of the molding space when the injection-molding machine is closed, due to the interaction of guide roller 106 and strip 110, in many cases a fixing as well of the uncoupled carriage 112 is desirable. For this purpose, another additional securing means 163 has to be provided. This securing means operates as follows:

As shown in FIG. 10, a further disk 164 is attached on the shaft 140. This disk 164 is arranged eccentrically in relation to the shaft 140, to be precise in such a way that the shaft-free part of the disk 164 points upward in the disengaged or unsecured position. The disk 164 on the shaft 140 is surrounded by a housing 165. This housing 165 is assigned a locking bolt 166, which at the opposite end has a detent 167. The locking bolt 166 is guided by a guide duct 168, made in the carriage arm 111, and a guide duct 169, made in the housing 113, as well as by a screw bolt 170, which passes parallel to the position of the shaft 140 through a slot 171.

If the shaft 140 is turned in direction y, the eccentrically arranged disk 164 presses the housing 165, and consequently the locking bolt 166, downward until the detent 167 comes to rest just above the running surface of the guide arm 115. A pawl 172 is fitted in the guide arm 115 in front of the stop 154. This pawl 172 lies in a pawl duct 173 and is sprung-mounted against a lower stop 174 by a spiral spring 175. A pawl catch 176 protrudes from the duct 173 upward out of the guide arm 115, the catch having toward the stop side of the guide arm 115 a vertical cut edge 177, whereas the opposite side has a sloping bearing face 178. Adapted to this pawl catch 176 is the detent 167, with a bearing face. Its vertical cut face faces in the direction of the injection-molding machine, whereas the sloping bearing face points in the direction of the stop side of the guide arm 115.

If the carriage 112 with the carriage housing 113 is displaced toward the stop 154, the detent 167 of the locking bolt 166 and the pawl catch 176 of the pawl 172 meet with their sloping bearing faces. Since the pawl 172 is sprung-mounted, it can be pressed away downward and the two bearing faces can slide one over the other until the vertical faces 177 engage behind the detent 167 and the pawl 172 springs back up. At this instant, the carriage housing 113 has reached the stop 154. The carriage 112 and the carriage housing 113 are fixed in their outermost end position and can no longer be moved in the direction of the injection-molding machine. An unwanted displacement of the handling means is ruled out.

To couple the apparatus to the injection-molding machine, which can take place only with the mold halves closed, the shaft 140 is turned against the direction of rotation y and the securing means 163 is thus released by raising of the locking bolt 166. At the same time, the forked bolt 130 is run out of the housing 113 and can assume its function as end-position retainer. Similarly, at the same time the strip 109 is let down, so that again a guide channel 108 for the guide roller 106 is formed.

As can be seen in FIGS. 7 and 10, at least one part of the carriage arm 111, which rests on the carriage housing 113, is detachably connected to the latter, in particular by dovetail guides. In this arrangement, a cover 181 of the carriage housing 113 has along the guide arm 115 one spline strip 182 on each of the two sides. Correspondingly, in the region of the carriage arm 111 there are spline strips 183 likewise provided on the underside 153, preferably welded-on, other fastening possibilities also being conceivable, such as for example screwed joints or the like.

The spline strips 182 and 183 are connected to each other by clamping pieces 184 with corresponding dovetail guide, which engage around the spline strips, and threaded bolts 185. As a result, the carriage arm 111 can be controlled in direction x.

I claim:

1. An apparatus for removing articles from a mold cavity between two mold halves, which comprises:
   two mold halves;
   a drive element connected to one of said mold halves;
   a drive wheel on the other of said mold halves driven by said drive element;
   a rocker set in pivoting motion by said drive wheel;
   an article removal device supported by an arm having predetermined end positions and connected to one of said mold halves, wherein said arm is guided by the rocker and wherein said rocker slides into a channel between two guide strips and moves out of said channel in each predetermined end position of the arm, with the arm being held in these end positions;
   a locking unit mounted on the mold half which is connected to the arm, said locking unit being operative to fix the arm in each end position; and
   a gear with a driving element thereof coupled to said locking unit and being fixed on the mold half not connected to the arm, wherein said gear allows locking when the rocker is situated out of said channel.

2. The apparatus as claimed in claim 1 wherein the locking unit has a slide which engages with a detent in a groove, with the groove being formed in the guide strip.

3. The apparatus as claimed in claim 2 wherein the detents are on the slide and are arranged offset along the direction of movement (y) of the slide.

4. The apparatus as claimed in claim 1 wherein the driving element is a rack which drives a gear wheel.

5. The apparatus as claimed in claim 2 wherein the gear includes a gear wheel which is connected by means of further gear wheels to an eccentric wheel which passes with an eccentrically arranged bolt through a slot in a carriage for the slide.

6. The apparatus as claimed in claim 5 wherein the gear wheels are coordinated with one another in such a way that the eccentric wheel engages the slide, and consequently the detent, with the groove or the locking bar when a carriage bearing the arm runs onto a stop and the rocker disengages from the channel.

7. The apparatus as claimed in claim 2 wherein the arm is passed through by a driven rod, on which three eccentrics are arranged and which is rotatable about its axis, and wherein a front eccentric is connected via a strip to the guide strip and raises the latter when the rod rotates.

8. The apparatus as claimed in claim 7 wherein a disk eccentrically seated on the driven rod raises the locking bar by means of a lever arm when the rod rotates.

9. The apparatus as claimed in claim 7 wherein a locking bolt which interacts with a fixed pawl is connected eccentrically to the rod.

10. The apparatus as claimed in claim 1 wherein the locking unit has a stationary end position fixing means which interacts with a counter element on the arm for fixing the arm in the end position, the counter element being a forked bolt with a forking into which the stationary end position fixing means runs in the end position.

11. The apparatus as claimed in claim 10 wherein the end position fixing means comprises a disk which has a section cut-out with two control edges for turning a solid disk part into the forking.

12. The apparatus as claimed in claim 11 wherein two end position fixing means are provided, which are arranged at a spacing (b) from each other.

13. The apparatus as claimed in claim 11 wherein the disks are arranged on a shaft which can be set in rotating motion via a gear unit.

14. The apparatus as claimed in claim 13 wherein the gear unit comprises at least one spur wheel which meshes with a rack or similar drive element being fixed on the other mold half.

15. The apparatus as claimed in claim 14 wherein the rack runs parallel to a rack for moving the rocker.

16. The apparatus as claimed in claim 15 wherein, for coordinating the engagement of the disks in the forking in the respective end positions, the gear unit is connected to the shaft via step up or step down wheels.

17. The apparatus as claimed in claim 10 comprising a securing means for the uncoupled arm in a device for lifting up the guide channel by raising a strip which is arranged on a rotary shaft, and a device for displacing the counter element provided on a rotary shaft.

18. The apparatus as claimed in claim 17 wherein the device includes a tilting lever which pivots about a pivot point fixed to a housing which is coupled at one end to the counter element and at the other end eccentrically to a disk on the shaft.

19. The apparatus as claimed in claim 1 wherein the two mold halves are of an injection molding machine.

20. The apparatus as claimed in claim 1 wherein the two mold halves are of a press.

21. The apparatus as claimed in claim 1 wherein the locking unit has a slide which engages with a locking bar arranged on the arm.

* * * * *